Oct. 10, 1967      A. J. WILLIAMS      3,346,012

FLUID CONTROL VALVES WITH FLOAT POSITION

Filed Oct. 11, 1963

INVENTOR
Arthur J. Williams

United States Patent Office

3,346,012
Patented Oct. 10, 1967

3,346,012
FLUID CONTROL VALVES WITH FLOAT POSITION
Arthur J. Williams, Hubbard, Ohio, assignor to Commercial Shearing & Stamping Company, a corporation of Ohio
Filed Oct. 11, 1963, Ser. No. 315,556
6 Claims. (Cl. 137—625.69)

This invention relates to fluid control valves with float position and more particularly to a hollow spool float valve adapted for use in combination with conventional parallel type valves such as the A-20 and A-35 type valves manufactured by Commercial Shearing and Stamping Co.

The use of valves having a "float" position in which the two sides of a double acting cylinder are directly connected together to permit a lift bucket, for example, to lower simply by forcing fluid from one side of a cylinder to the other by means of the bucket weight and thereby eliminate cavitation has been practiced for many years and their advantages, particularly for use on earth-moving equipment, are well recognized and will not be belabored here. However, valves of the prior art which had such a float position were very limited in their usefulness because their nature was such that they had to be used alone or had to be the last valve in any group in order to be usable and permit the other valves to be operated.

I have invented a control valve having a float position which is universally applicable in any position in any combination of conventional parallel valves. This provides a universality long sought but never before achieved to my knowledge.

Preferably, I provide a housing having a bore extending therethrough and open at each end to receive an elongated spool valve element, a fluid inlet in said housing extending transverse to said bore and intersecting the bore intermediate its ends, a fluid outlet in said housing extending transversely of said bore and intersecting the bore at a point adjacent to but spaced from the intersection of the inlet passage, a parallel fluid inlet in the housing spaced from the fluid inlet and adapted with the fluid inlet to receive high pressure fluid from a source of fluid under pressure, a valve element slidable in said bore, said valve element being hollow along its axis from a point adjacent one end to a point adjacent the opposite end, a pair of high pressure outlets intersecting the bore one on either side of the said fluid inlet and outlet, a pair of exhaust outlets in the housing intersecting the bore on either side of the fluid inlet and outlet and passage means communicating between the parallel fluid inlet and the bore adjacent each of the high pressure outlets, said valve element having a neutral position in which fluid passes directly through the fluid inlet and the bore into the fluid outlet, a power position for each high pressure outlet which directs fluid from the parallel fluid inlet through the said passage means to one high pressure outlet while directing fluid from the other high pressure outlet to an exhaust outlet and a float position in which the two high pressure outlets are connected together through the hollow axis of the valve element. Preferably, the valve element is provided with bleeder means communicating between one of the exhaust outlets and said hollow axis and high pressure outlets permitting excess fluid in the system to be exhausted during the float position. Preferably, detent means are provided to hold the valve element in the float position and selectively in the raise position. Self-centering means are provided to return the valve element to neutral in all positions except those having operative detent positions.

In the foregoing general description, I have set out certain objects, advantages and purposes of my invention. Other objects, advantages and purposes of this invention will be apparent from the following description and the accompanying drawings in which FIGURE 1 is a vertical section through the valve of my invention with the valve element in neutral position;

Figure 1:
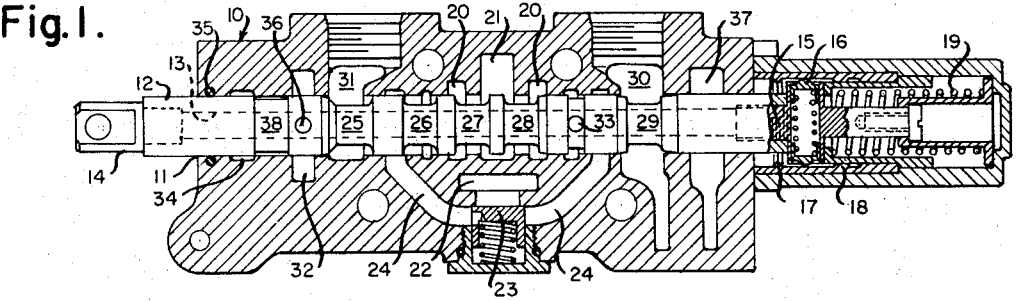

Referring to the drawings, I have illustrated a valve housing or body 10 having a longitudinal bore 11 slidably receiving a valve element or spool 12. The spool 12 is provided with an axial passage 13 which is plugged at one end with clevis 14 to receive an operating handle and at the opposite end by poppet carrier 15. The operation of the poppet carrier 15 is believed to be obvious from the drawing. In the extreme left position of valve spool 12 (viewing the figures), the poppets 16 are held behind detent 17. At the extreme right (viewing the figures) the poppets 16 are held behind detent 18. Between detents 17 and 18 the spool 12 is centered at the neutral position by centering spring 19. High pressure fluid enters the valve through high pressure inlets 20 and leaves the valve through high pressure outlet 21. At the same time high pressure fluid enters parallel inlet passage 22 and passes through check valve 23 into passage 24. In the neutral position shown in FIGURE 1, the fluid in parallel inlet 22 and passage 24 is stationary while fluid passes from inlets 20 through the bore 11 by way of grooves 27 and 28 in spool 12.

When the spool 12 is shifted to the extreme left (viewing the figures), the poppets 16 are engaged behind detent 17 and the flow of pressure fluid from inlets 20 to outlet 21 is interrupted and pressure fluid is then passed through parallel inlet 22 through check valve 23 into passage 24 through groove 29 into high pressure outlet passage 30 to the raise side of a hydraulic cylinder (not shown). At the same time fluid returned from the opposite end of the hydraulic cylinder is returned through high pressure outlet passage 31, through groove 25 of spool 12 into exhaust passage 32. At the same time openings 33 are in communication with center passage 13 of spool 12 and this passage is filled with high pressure fluid. Exhaust passage 34's communication with exhaust passage 32 is provided to protect O ring 35 from pressure of fluid which might escape through openings 36 in spool 12, during this position. In this position of the spool 12 high pressure fluid is fed continuously from outlet 30 until spool 12 is manually moved to release poppets 16 from detent 17.

Figure 2:
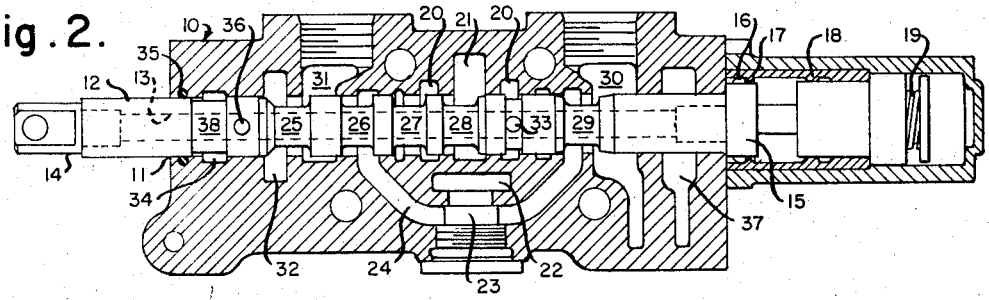
FIGURE 2 is a section identical with FIGURE 1 with the valve element in raise position on a detent to lift a load.
Figure 3:
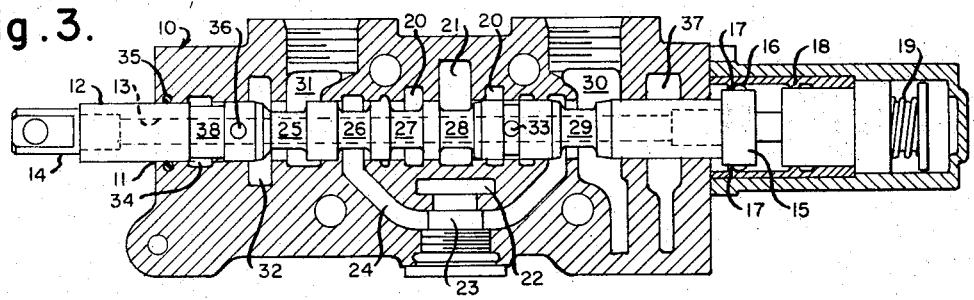
FIGURE 3 is a section identical with FIGURE 1 with the valve element in raise position for self-centering.

In FIGURE 3 I have illustrated the spool 12 in the self-centering raise position with the poppets 16 bearing against detent 17 but not behind the detent as in FIGURE 2. In this position the flow of fluid is the same as in FIGURE 2, however, self-centering spring 19 will move spool 12 to neutral when the spool is released.

Figure 4:
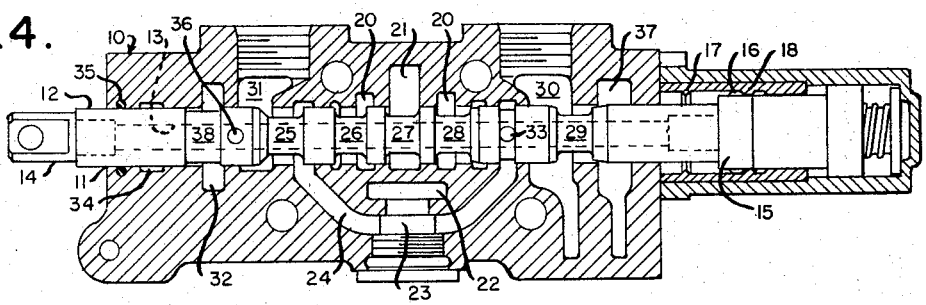
FIGURE 4 is a section identical with that of FIGURE 1 with the valve element in lower position to lower a load.

FIGURE 4 illustrates the down or lowering position of spool 12. Spool 12 is moved against detent 18 but not over it and again fluid is prevented from flowing from inlet passages 20 to outlet passage 21, while caused to flow through passage 22, check valve 23 and passage 24 through groove 25 into high pressure outlet 31. Fluid returned to the valve enters high pressure outlet 30, passes around groove 29 in spool 12 and is discharged to exhaust passage 37 from which it goes to reservoir (not shown). If the operator releases spool 12, the spring 19 returns the spool to neutral.

Figure 5:
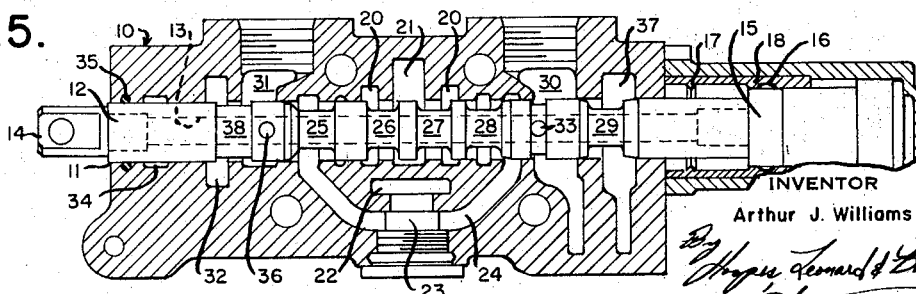
FIGURE 5 is a section identical with that of FIGURE 1 with the valve element in float position.

In the position of the spool shown in FIGURE 5, the unit is in float position, with poppets 16 engaged in detent 18 to hold until manually released. Fluid entering high pressure inlets 20 passes through grooves 26 and 27 to outlet 21 and at the same time passes through parallel inlet 22 but remains stationary in passage 24. This permits operation of valves beyond the valve of this invention. Fluid entering high pressure outlet 30 is passed through openings 33 in spool 12 into central passage 13 in the spool from which it is discharged into high pressure outlet 31 from which it goes to the opposite side of the work cylinder from the fluid entering outlet 30. Since one side of a double acting work cylinder usually does not contain the moving piston rod, a larger amount of fluid is returned to outlet 30 from that one side of the work cylinder than can be accepted by the side of the cylinder carrying the piston rod. The difference in volume is the volume of the piston rod entering the cylinder during lowering. This creates an excess of fluid entering outlet 31. This excess fluid is discharged into exhaust passage 32 by means of a bleeder groove 38 which is dimensioned to pass sufficient oil to permit rapid lowering but prevent cavitation by reason of insufficient fluid going from outlet 31 to the hydraulic work cylinder. The spool 12 will remain in this position until the poppets 16 are moved out of engagement with detent 18.

In all positions of spool 12 fluid in parallel inlet passage 22 is free to flow to the next following valve or valves thus permitting the valve of this invention to be placed in any desired position in an assembly of multiple valves.

In the foregoing specification and accompanying drawings, I have illustrated a present preferred embodiment of my invention, however, it will be recognized by those skilled in the art that the invention may be otherwise embodied within the scope of the following claims.

I claim:
1. In a control valve, a housing having a bore extending therethrough and open at each end to receive an elongated spool valve element, a fluid inlet in said housing extending transverse to said bore and intersecting the bore intermediate its ends, a fluid outlet in said housing extending transversely of said bore and intersecting the bore at a point adjacent to but spaced from the intersection of the inlet passage, a parallel fluid inlet in the housing spaced from the fluid inlet and extending transversely of the bore in a plane spaced from the bore and adapted with the fluid inlet to receive high pressure fluid from a source of fluid under pressure to conduct said fluid through the housing by-passing the bore, a valve element slidable in said bore, said valve element being hollow along its axis from a point adjacent one end to a point adjacent the opposite end and having spaced grooves and lands on the periphery thereof, said lands sealingly engaging the bore, a pair of high pressure outlets intersecting the bore one on either side of the said fluid inlet and outlet, a pair of exhaust outlets in the housing intersecting the bore on either side of the fluid inlet and outlet and passage means spaced from the bore communicating between the parallel fluid inlet and the bore adjacent each of the high pressure outlets, a pair of spaced ports in lands on said valve element, said ports communicating with the hollow interior of the valve element, and being spaced on the valve element so that they are effectively sealed by said bore against high pressure fluid transmission in any power position of the valve element, said valve element having a neutral position in which fluid passes directly through the fluid inlet and the bore into the fluid outlet, a power position for each high pressure outlet which directs fluid from the parallel fluid inlet through the said passage means to one high pressure outlet while directing fluid from the other high pressure outlet to an exhaust outlet and a float position in which the two high pressure outlets are connected through the ports in the valve element and the hollow axis of the valve element, said valve element having a bleeder means communicating between an exhaust outlet and said hollow axis and high pressure outlets permitting excess fluid in the system to be exhausted during the float position.

2. In a control valve, a housing having a bore extending therethrough and open at each end to receive an elongated spool valve element, a fluid inlet in said housing extending transverse to said bore and intersecting the bore intermediate its ends, a fluid outlet in said housing extending transversely of said bore and intersecting the bore at a point adjacent to but spaced from the intersection of the inlet passage, a parallel fluid inlet in the housing spaced from the fluid inlet and extending transversely of the bore in a plane spaced from the bore and adapted with the fluid inlet to receive high pressure fluid from a source of fluid under pressure to conduct said fluid through the housing by-passing the bore, a valve element slidable in said bore, said valve element being hollow along its axis from a point adjacent one end to a point adjacent the opposite end and having spaced grooves and lands on the periphery thereof, said lands sealingly engaging the bore, a pair of high pressure outlets intersecting the bore one on either side of the said fluid inlet and outlet, a pair of exhaust outlets in the housing one intersecting the bore on the side of each of the high pressure outlets opposite the fluid inlet and outlet and passage means spaced from the bore communicating between the parallel fluid inlet and the bore adjacent each of the high pressure outlets, a pair of spaced ports in lands on said valve element, said ports communicating with the hollow interior of the valve element, and being spaced on the valve element so that they are effectively sealed by said bore against high pressure fluid transmission in any power position of the valve element, said valve element having a neutral position in which fluid passes directly through the fluid inlet and the bore into the fluid outlet, a power position for each high pressure outlet which directs fluid from the parallel fluid inlet through the said passage means to one high pressure outlet while directing fluid from the other high pressure outlet to an exhaust outlet and a float position in which the two high pressure outlets are connected through the ports in the valve element and the hollow axis of the valve element, said valve element having a bleeder means communicating between an exhaust outlet and said hollow axis and high pressure outlets permitting excess fluid in the system to be exhausted during the float position.

3. In a control valve, a housing having a bore extending therethrough and open at each end to receive an elongated spool valve element, a fluid inlet in said housing extending transverse to said bore and intersecting the bore intermediate its ends, a fluid outlet in said housing extending transversely of said bore and intersecting the bore at a point adjacent to but spaced from the intersection of the inlet passage, a parallel fluid inlet in the housing spaced from the fluid inlet and extending transversely of the bore in a plane spaced from the bore and adapted with the fluid inlet to receive high pressure fluid from a source of fluid under pressure to conduct said fluid through the housing by-passing the bore, a valve element slidable in said bore, said valve element being hollow along its axis from a point adjacent one end to a point adjacent the opposite end, a pair of high pressure outlets intersecting the bore one on either side of the said fluid inlet and outlet, a pair of exhaust outlets in the housing intersecting the bore on either side of the fluid inlet and outlet and passage means communicating between the parallel fluid inlet and the bore adjacent each of the high pressure outlets, a pair of spaced ports in lands on said valve element, said ports communicating with the hollow interior of the valve element, and being spaced on the valve element so that they are effectively sealed by said bore against high pressure fluid transmission in any power position of the valve element, said valve element having spaced annular grooves providing a neutral position in which fluid passes directly through the fluid inlet, a pair of spool grooves and the bore into the fluid outlet, a power position for each high pressure outlet in which fluid from the parallel fluid inlet passes through the said passage means a groove in the spool to one high pressure outlet while fluid returns from the other high pressure outlet through a spaced groove in the spool to an exhaust outlet and a float position in which the two high pressure outlets are connected through the ports in the valve element and the hollow axis of the valve element, said valve element having a bleeder means communicating between an exhaust outlet and said hollow axis and high pressure outlets permitting excess fluid in the system to be exhausted during the float position.

4. A control valve as claimed in claim 3 wherein detent means are fixed to the valve housing engaging poppet means on the valve element to hold the valve element in the float position.

5. A control valve as claimed in claim 4 wherein second detent means are fixed to the valve housing selectively engaging the said poppet means in one of said power positions selectively to hold the valve element in said power position.

6. A control valve as claimed in claim 5 wherein resilient means are fixed to the housing automatically moving the valve element from all positions in which the poppets do not engage a detent to the neutral position.

References Cited
UNITED STATES PATENTS

| | | | |
|---|---|---|---|
| 2,949,097 | 12/1957 | Vander Kaay | 137—596.12 |
| 3,120,858 | 8/1964 | Markovich | 137—625.69 |

WILLIAM F. O'DEA, *Primary Examiner.*

H. M. COHN, *Assistant Examiner.*